(12) United States Patent
Plont

(10) Patent No.: US 11,653,794 B2
(45) Date of Patent: May 23, 2023

(54) UTENSIL HOLDER

(71) Applicant: DAPL LLC, Laingsburg, MI (US)

(72) Inventor: David Lloyd Plont, Laingsburg, MI (US)

(73) Assignee: DAPL LLC, Laingsburg, MI (US)

( * ) Notice: Subject to any disclaimer, the term of this patent is extended or adjusted under 35 U.S.C. 154(b) by 71 days.

(21) Appl. No.: 17/496,145

(22) Filed: Oct. 7, 2021

(65) Prior Publication Data
US 2023/0042902 A1   Feb. 9, 2023

Related U.S. Application Data

(60) Provisional application No. 63/230,131, filed on Aug. 6, 2021.

(51) Int. Cl.
A47J 47/16 (2006.01)
A47J 37/07 (2006.01)

(52) U.S. Cl.
CPC ........... *A47J 47/16* (2013.01); *A47J 37/0786* (2013.01)

(58) Field of Classification Search
CPC ........ A47J 47/16; A47J 37/0786; A47J 47/00; A47J 37/049; A47G 21/14; A47G 21/145; F16M 11/041
USPC .................................................. 248/545, 302
See application file for complete search history.

(56) References Cited

U.S. PATENT DOCUMENTS

| | | | | |
|---|---|---|---|---|
| 1,423,612 A * | 7/1922 | Jewett | ...................... | A47J 33/00 126/30 |
| 1,536,678 A * | 5/1925 | Markowski | .............. | A01G 9/12 248/302 |
| 1,537,237 A * | 5/1925 | Kaestner | ............... | B05B 15/622 248/87 |
| 2,202,739 A * | 5/1940 | Kilby | ..................... | A01K 97/10 248/517 |
| 2,519,612 A * | 8/1950 | Tuttle | ..................... | A01K 97/10 126/30 |
| 2,522,223 A * | 9/1950 | Hardin | ................ | A47J 37/0763 126/30 |
| 2,827,846 A * | 3/1958 | Karkling | ............. | A47J 37/0763 126/30 |
| 2,940,439 A * | 6/1960 | Bartels | .................... | A47J 33/00 126/30 |

(Continued)

OTHER PUBLICATIONS https://www.amazon.com/Maverick-A0-01-BBQ-Accessory-Organizer/dp/B003VEMSAC/ Maverick A0-01 Outdoor BBQ Tool and Accessory Organizer At least by Jul. 3, 2014.

(Continued)

*Primary Examiner* — Nkeisha Smith
(74) *Attorney, Agent, or Firm* — Mitchell Law PLLC; Matthew W. Mitchell

(57) ABSTRACT

A utensil holding device is disclosed. The device includes one or more removeable and adjustable arms, a continuous rod having a plurality of sections including a first section configured for insertion into the ground, a second section configured to abut the ground and provide support, and a third section configured to receive the one or more removeable and adjustable arms. The sections are preferably integrally connected and formed of a continuous rod having a plurality of bends. Certain embodiments of the one or more removeable and adjustable arms are formed of a disc-shaped end and an elongated rod. The disc-shaped end is a partially folded disc in some embodiments.

13 Claims, 7 Drawing Sheets

(56) References Cited

U.S. PATENT DOCUMENTS

| | | | | |
|---|---|---|---|---|
| 3,526,217 A * | 9/1970 | Garske | A47J 37/0763 | 126/30 |
| 3,749,253 A * | 7/1973 | Carter | A45F 3/44 | 211/171 |
| 4,269,164 A * | 5/1981 | Van Grinsven | A47J 37/0763 | 126/30 |
| 4,513,936 A * | 4/1985 | Goulter | A47J 33/00 | 248/156 |
| 4,538,589 A * | 9/1985 | Preston | A47J 33/00 | 126/30 |
| 4,591,420 A * | 5/1986 | Van Horn | C25D 13/22 | 248/302 |
| 4,607,608 A * | 8/1986 | Allred | A47J 33/00 | 126/30 |
| 4,938,446 A * | 7/1990 | Williams | A01K 97/10 | 248/530 |
| 5,297,534 A * | 3/1994 | Louden | A47J 37/0763 | 126/30 |
| 5,323,991 A * | 6/1994 | West | A01K 97/10 | 248/513 |
| 5,855,286 A * | 1/1999 | Zaid | A47K 5/12 | 211/85.7 |
| 5,862,742 A * | 1/1999 | Bjerg | A47J 33/00 | 126/30 |
| 5,944,009 A * | 8/1999 | Scheller | A47J 33/00 | 126/30 |
| 6,298,843 B1 * | 10/2001 | Olsen | A47J 37/0763 | 126/30 |
| 6,371,139 B1 * | 4/2002 | Simchori | E04H 12/2223 | 248/156 |
| 6,640,797 B1 * | 11/2003 | Magers | F24B 1/205 | 126/30 |
| 6,732,985 B1 * | 5/2004 | Cantrell | A45F 3/44 | 248/156 |
| 7,080,811 B2 * | 7/2006 | Thompson | A47J 33/00 | 126/29 |
| 7,334,593 B2 * | 2/2008 | Avery | A45B 1/00 | 248/541 |
| 11,083,333 B2 * | 8/2021 | Pribyl | A47J 37/04 | |
| 2014/0353439 A1 * | 12/2014 | Schilling | A47G 7/041 | 248/302 |

OTHER PUBLICATIONS https://www.outdoority.com/utensils/22787-utensil-tree.html Utensil Tree Zippo-Outdoors undated.
https://50campfires.com/zippo-outdoor-utensil-tree-review/ Zippo Outdoor Utensil Tree Review undated.

* cited by examiner

UTENSIL HOLDER

TECHNICAL FIELD

This disclosure relates to utensil holders, and more particularly to utensil holders that may be used in an outdoor environment.

BACKGROUND

The statements in this section merely provide background information related to the present disclosure and may not constitute prior art.

People have enjoyed cooking outdoors with campfires, grills or barbeques for years. In the typical outside cooking situation, a cook, e.g., a griller or barbequer, uses many different utensils to help cook the food. For example, the cook may use any number of a forks, spatulas, scrapers, a pair of tongs, etc. when cooking various food items. The cook usually needs to use a variety of these utensils throughout the cooking process and usually will switch between them. When switching, a problem arises of where to place the utensil. Some grills or barbeque machines will have shelves or hooks, while some campfire grills will not. Keeping utensils on a shelve when cooking can lead to cleanliness or sanitary issues, affecting other utensils or other cooking accessories. A shelf can be further ill-suited for receiving hot or sharp items.

Hence, there is a need for a portable, adjustable utensil holder.

SUMMARY

A utensil holding device is disclosed. The device includes one or more removeable and adjustable arms, a continuous rod having a plurality of sections including a first section configured for insertion into the ground, a second section configured to abut the ground and provide support, and a third section configured to receive the one or more removeable and adjustable arms. The sections are preferably integrally connected and formed of a continuous rod having a plurality of bends.

Certain embodiments of the one or more removeable and adjustable arms are formed of a disc-shaped end and an elongated rod. The disc-shaped end is a partially folded disc in some embodiments.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1A:
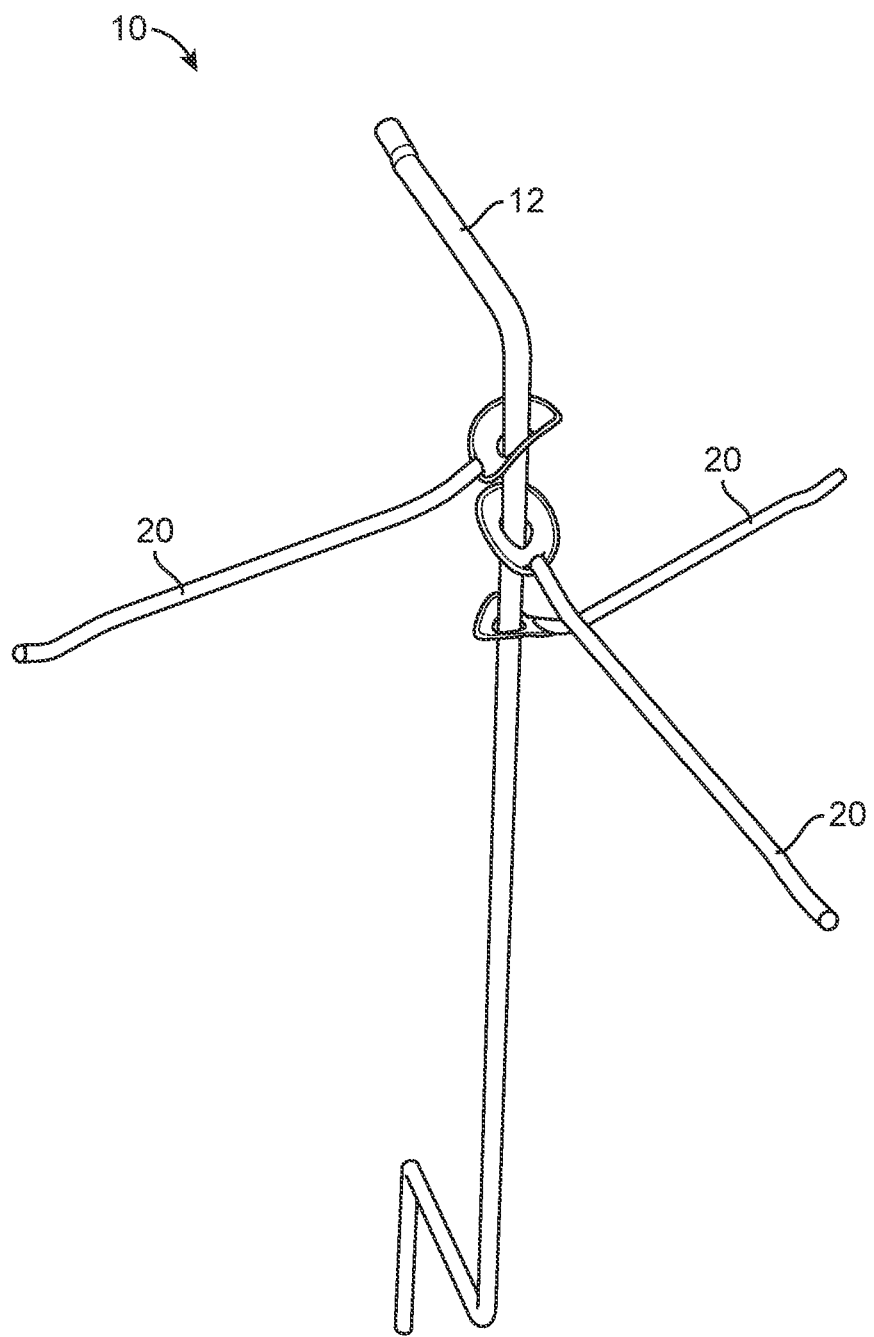
FIG. 1A shows an exemplary assembled utensil holder, in accordance with the present disclosure.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of "a," "an," and "the" includes plural reference, the meaning of "in" includes "in" and "on." The term "based upon" is not exclusive and allows for being based on additional factors not described, unless the context clearly dictates otherwise. Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

Figure 1B:
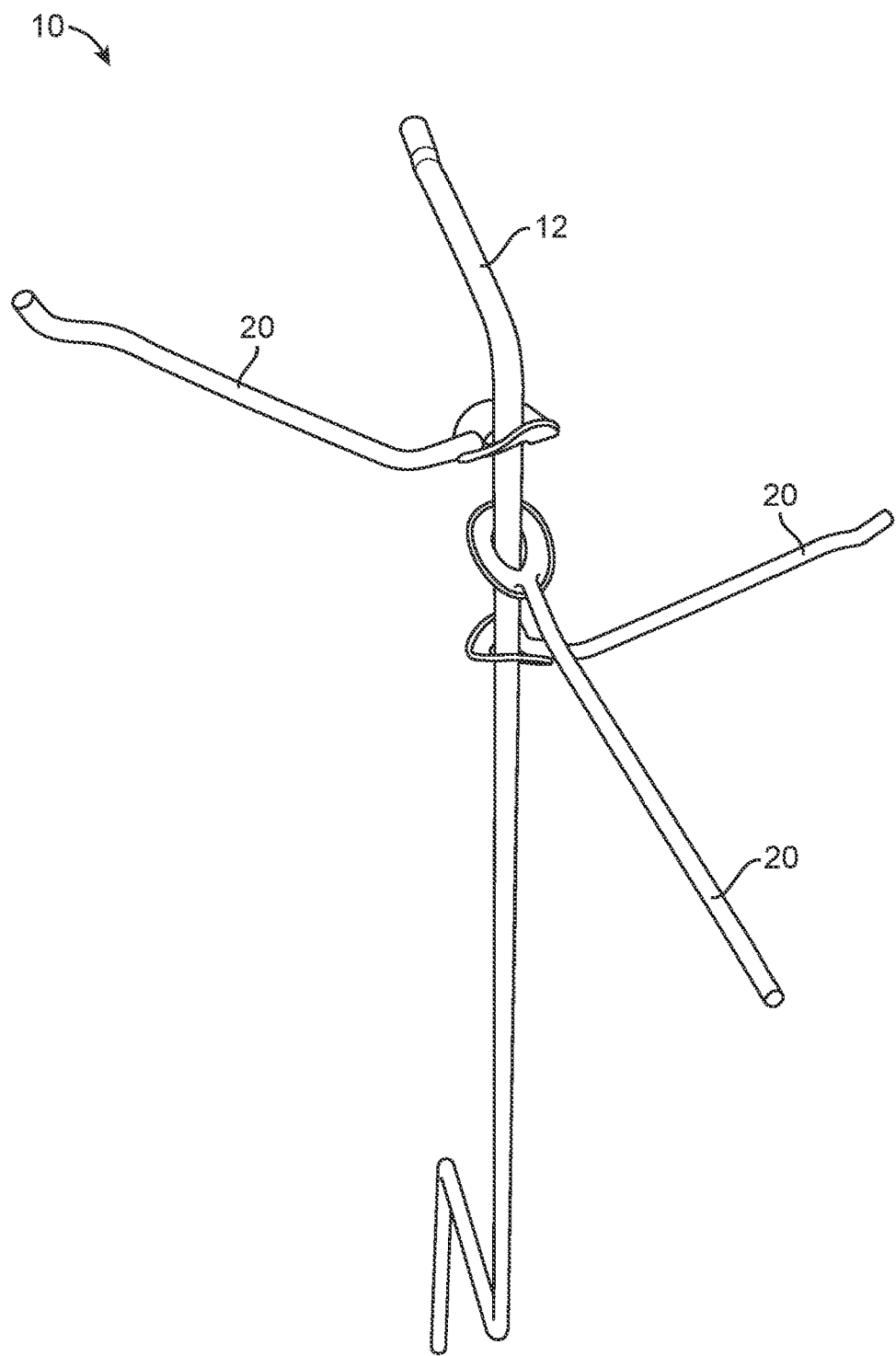
FIG. 1B shows another view of the assembled utensil holder, in accordance with the present disclosure.

Referring now to the drawings, wherein the depictions are for the purpose of illustrating certain exemplary embodiments only and not for the purpose of limiting the same, FIGS. 1A and 1B show a utensil holder 10 according to some embodiments. The utensil holder 10 in the embodiments illustrated in FIGS. 1A and FIG. 1B include a primary continuous rod 12 and one or more exemplary adjustable rods 20.

As shown the primary continuous rod 12 is a single, integral and continuous rod. It is contemplated, however, that alternate embodiments of the invention are not formed of a continuous rod or an elongate member, but formed of separate members. In one embodiment, the primary continuous rod 12 is formed of a plurality of mechanically connectable rods, which may be connected via threaded male and female ends, sleeves, and/or various clip elements, for example. In another embodiment, sections may be welded together. In one embodiment, the primary continuous rod 12 is integrally formed, such as by casting, stamping, molding, forging, or machining from stock. In one embodiment, the primary continuous rod 12 is formed by bending a rod.

The primary continuous rod 12 and the one or more exemplary adjustable rods 20 may be each formed of any one of a polymer, a metal, an alloy, or a ceramic alloy. In various embodiments, a cast iron or an iron-based material such as a low alloy steel is used. It is contemplated that many known material types may be suitable as are known in the art.

It is contemplated that the primary continuous rod 12 of the illustrated embodiments have a circular or rounded cross-sectional shape. However, in various embodiments, the primary continuous rod 12 may have cross-sectional shapes that are square, rectangular, triangular, hexagonal, octagonal or any other cross-sectional shape that is readily apparent to one skilled in the art.

Figure 2:
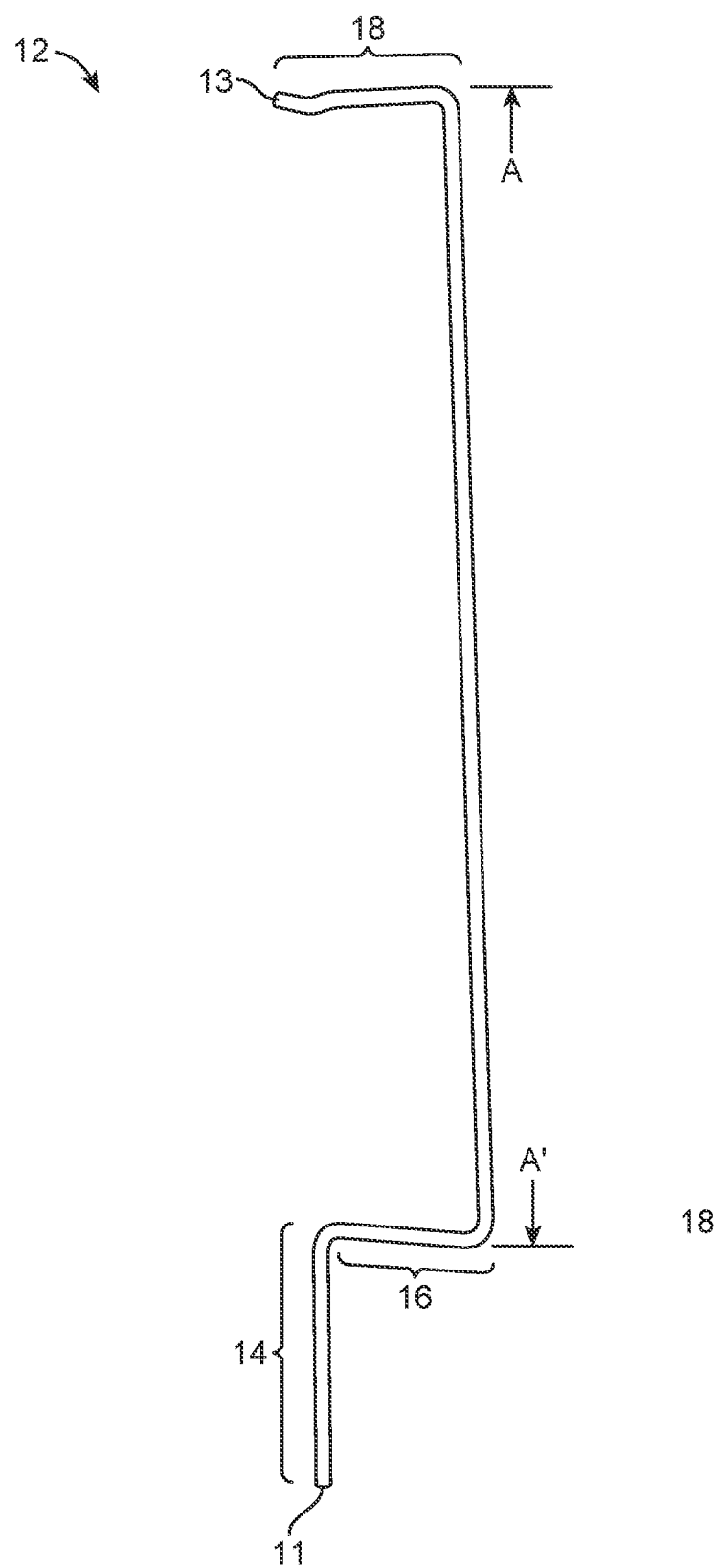
FIG. 2 shows an exemplary primary continuous rod of the utensil holder, in accordance with the present disclosure.

With reference to FIG. 2, an exemplary embodiment of the primary continuous rod 12 is shown. As FIG. 2 shows, the primary continuous rod 12 includes an end 11 of a first portion 14. The end 11 may be pointed or spiked to facilitate insertion of the utensil holder 10 into the ground. Although it is contemplated that a flat end 11 would be adapted for insertion into most ground soil types. In one embodiment, the first portion 14 is a straight elongated section as substantially shown. In one embodiment, the first portion 14 may be helically-shaped for aiding insertion into the ground via a screw-like turns.

A second section 16 is shown as substantially perpendicular to the first section 14. The second section 16 is contemplated as abutting the ground to provide stability. A third section, substantially traversing from A' to A is shown. The third section is preferably substantially parallel with the first section 14 and perpendicular to the second section 16. The third section is preferably sized with a length to aid in comfortable and convenient access to the utensils on the adjustable rods 20 and for preferable storage thereon.

A fourth section 18 is preferably perpendicular to the first and third sections and parallel with the second section 16. In one embodiment, the fourth section 18 is a same or similar length as the second section 16 to provide physical balance to the utensil holder 10 when weighed with utensils. The primary continuous rod 12 preferably has an end 13 that may be capped to protect the cook or user from cuts. In one embodiment, the end 13 is smoothed or rounded.

Figure 3:
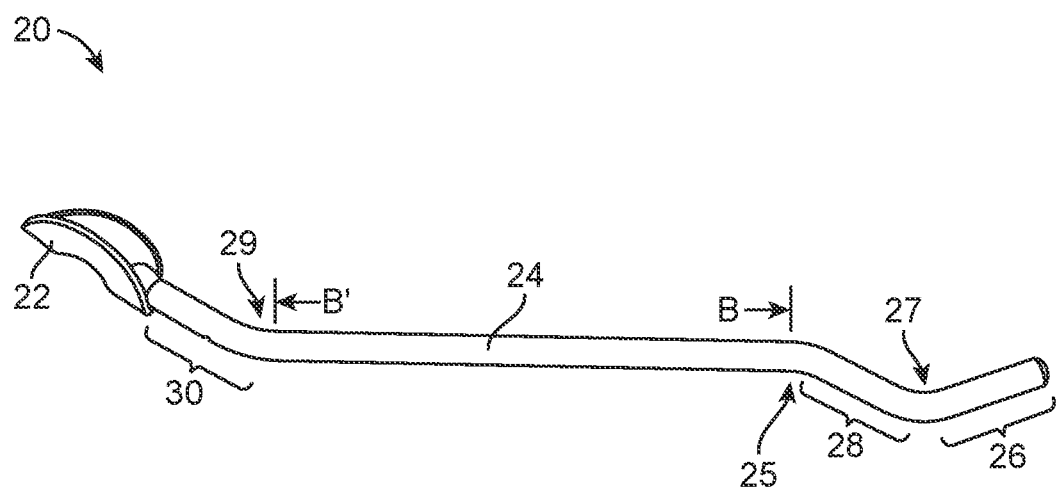
FIG. 3 show an exemplary adjustable rod, in accordance with the present disclosure.
Figure 4:
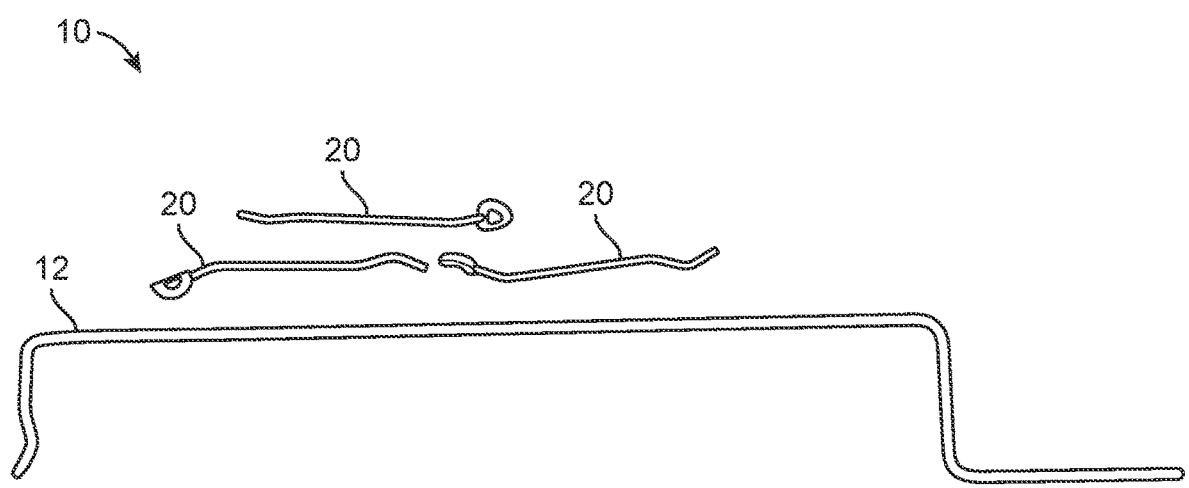
FIG. 4 shows the exemplary utensil holder in an unassembled state, in accordance with the present disclosure.

With specific reference to FIG. 3, an exemplary adjustable rod 20 is shown. The exemplary adjustable rods 20 function as arms on the utensil holder 10 from which the utensils may be selectively hung. As FIG. 3 shows, the adjustable rod 20 includes a disc-shaped end 22, having an inner opening for receiving the primary continuous rod 12. The inner opening is preferably sized and shaped to receive the primary continuous rod 12. In one embodiment, the disc-shaped end 22 is welded or bonded to a rod having one or more bends.

When assembled, the disc-shaped end 22 presses against one side of the third section of the continuous rod 12 and pushes against an opposing side of the third section of the continuous rod 12, thereby remaining in a selected, secured position. To put it another way, disc-shaped end 22 pivots on the third section of the continuous rod 12 to remain in place.

The adjustable rod 20 preferably includes a plurality of sections, 24, 26, 28, and 30. A first section 30 is preferably bent at area 29 so that a second section 24 is substantially parallel with the ground or sections 16 and 18 of the primary continuous rod 12. By being parallel, the utensils can be hung more securely. Sections 26 and 28 are bent at area 27 so that the utensils do not slide off. Section 24 is an elongated section that is preferably straight and sized and shaped to receive and secure the utensils. The exemplary section 24 is elongated preferably between B' and B, as shown in FIG. 3. Sections 24 and 28 may be bent at area 25 so that the utensils do not slide off.

The adjustable rod 20 is preferably integrally formed, but may be mechanically connected, welded together, or otherwise secured as is known in the art. In one embodiment, a rod is bent and then welded or bonded to a bent washer.

Figure 5:
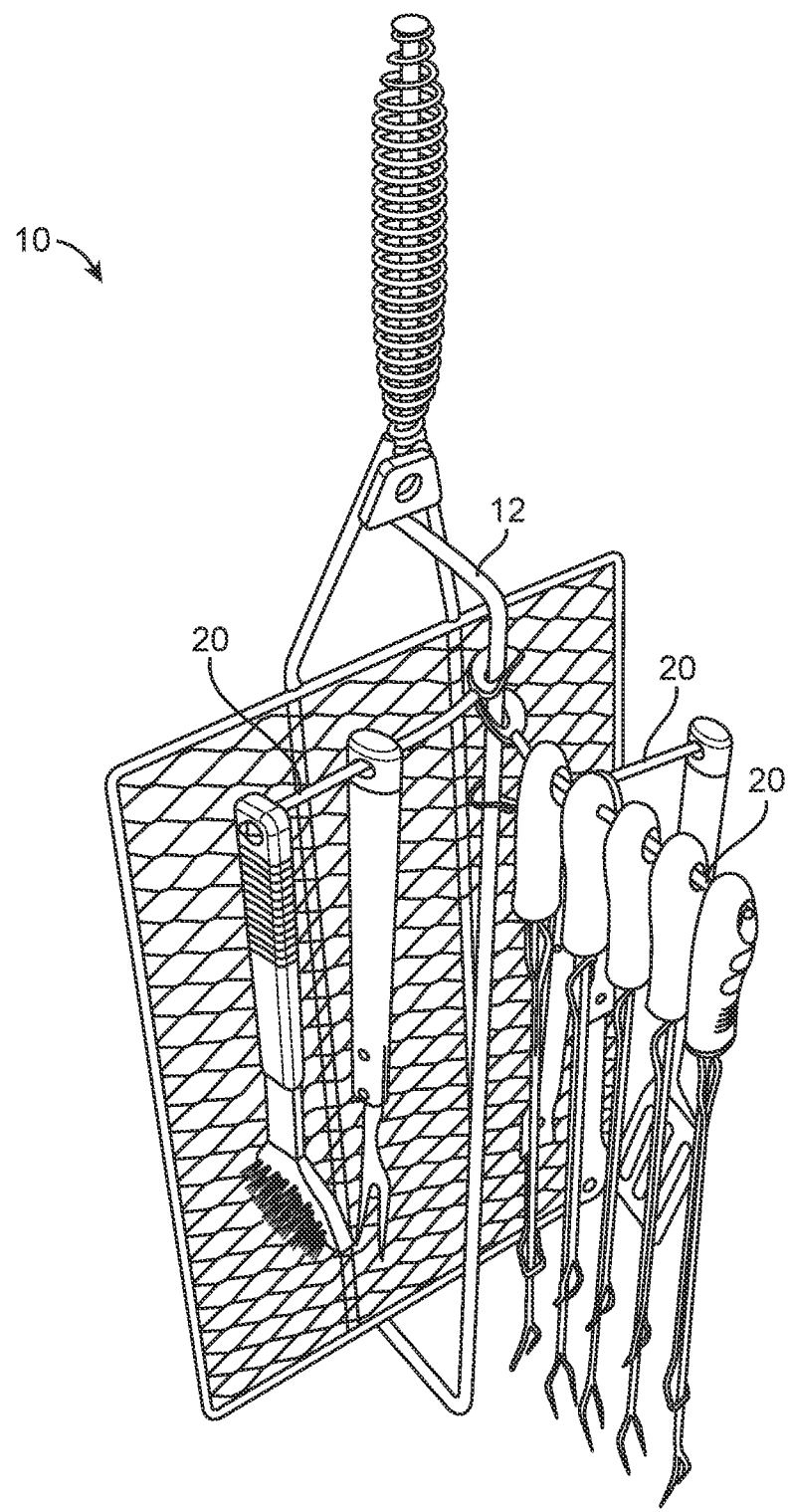
FIG. 5 shows the exemplary assembled utensil holder with exemplary utensils, in accordance with the present disclosure.

With specific reference to FIG. 5, the exemplary utensil holder 10 is depicted with exemplary utensils. As FIG. 5 shows, the adjustable rods 20 are positioned at desired locations on the continuous rod 12. Utensils are then hung on the adjustable rods 20.

In use, the utensil holder 10 is inserted into the ground or other suitable receptive area. The utensil holder 10 is preferably inserted so that the continuous rod 12 is substantially vertically aligned, i.e., perpendicular to the ground surface. In some embodiments, the utensil holder 10 is pushed into the ground proximate to a campfire, grill or barbeque. The cook may then selectively hang various utensils as desired, thereby freeing any shelf space for other items and promoting more sanitary conditions by avoiding potential cross-containment.

Figure 6:
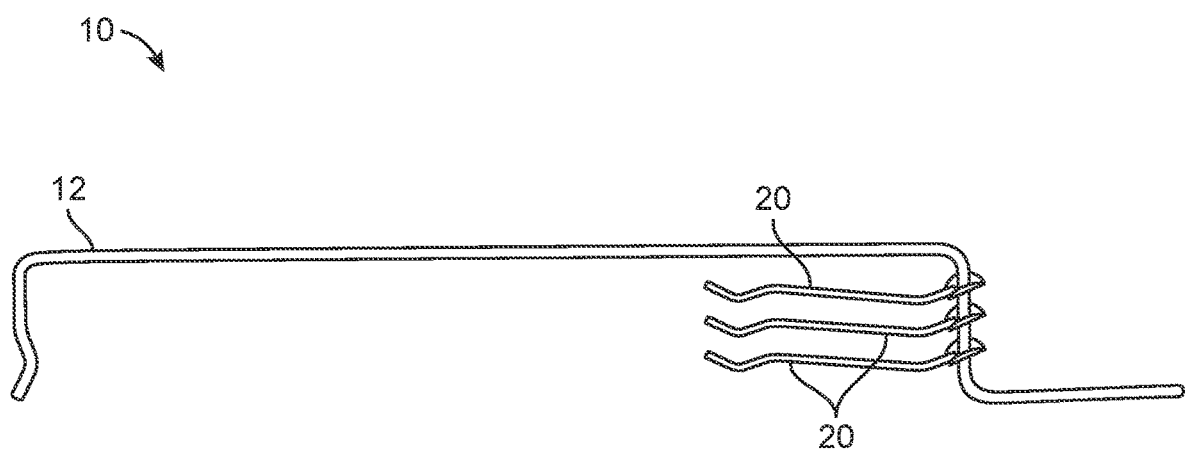
FIG. 6 shows the exemplary utensil holder in an unassembled state for storage or shipping, in accordance with the present disclosure.

In storage or shipping, the adjustable rods 20 may be positioned on one of the sections 16 and/or 18 so the assembled utensil holder 10 is compact. For example, FIG. 6 shows the adjustable rods 20 positioned on section 16.

In the above description, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A device comprising:
   one or more removeable and adjustable arms, wherein the one or more removeable and adjustable arms are formed of a disc-shaped end and an elongated rod and wherein the disc-shaped end is a partially folded disc; and
   a continuous rod having a plurality of sections including a first section configured for insertion into the ground, a second section configured to abut the ground and provide support, and a third section configured to receive the one or more removeable and adjustable arms, and a fourth section substantially parallel to the second section and configured to receive utensils for hanging thereon, wherein the first section and the third section are substantially parallel and are substantially perpendicular to the second and fourth sections.

2. The device of claim 1, wherein the first, second, third, and fourth sections are integrally connected.

3. The device of claim 1, wherein the continuous rod comprises a circular or rounded cross-sectional shape.

4. The device of claim 1, wherein the elongated rod comprises a plurality of bends.

5. The device of claim 4, wherein the plurality of bends includes a first bend from the disc-shaped end into the elongated rod at an angle whereat the elongated rod is substantially parallel to the second and fourth sections of the continuous rod.

6. The device of claim 5, wherein a second bend is configured to inhibit utensils from sliding off the elongated arm.

7. The device of claim 1, wherein the continuous rod comprises a circular or rounded cross-sectional shape.

8. The device of claim 7, wherein the disc-shaped end is a partially folded disc.

9. The device of claim 8, wherein the elongated rod comprises a plurality of bends.

10. The device of claim 9, wherein the plurality of bends includes a first bend from the disc-shaped end into the elongated rod at an angle whereat the elongated rod is substantially parallel to the second and fourth sections of the continuous rod, and wherein the plurality of bends includes a second bend is configured to inhibit utensils from sliding off the elongated arm.

11. A device comprising:
one or more removeable and adjustable arms, comprising a disc-shaped end and an elongated rod; and
a continuous rod having a plurality of integral sections including a first section configured for insertion into the ground, a second section configured to abut the ground and provide support, and a third section configured to receive the one or more removeable and adjustable arms, wherein the continuous rod comprises a fourth section substantially parallel to the second section and configured to receive utensils for hanging thereon, wherein the first section and the third section are substantially parallel and wherein the first and third sections are substantially perpendicular to the second and fourth sections, and wherein the first, second, third and fourth sections are in a same axial plane.

12. A device comprising:
one or more removeable and adjustable arms, comprising a disc-shaped end and an elongated rod, wherein the disc-shaped end is a partially folded disc;
a continuous rod, having a circular or rounded cross-sectional shape, and comprising a plurality of integral sections including a first section configured for insertion into the ground, a second section configured to abut the ground and provide support, a third section configured to receive the one or more removeable and adjustable arms, and a fourth section substantially parallel to the second section and configured to receive utensils for hanging thereon; and
wherein the first section and the third section are substantially parallel and wherein the first and third sections are substantially perpendicular to the second and fourth sections, and wherein the first, second, third and fourth sections are in a same axial plane.

13. The device of claim 12, wherein the elongated rod comprises a plurality of bends, wherein the plurality of bends includes a first bend from the disc-shaped end into the elongated rod at an angle whereat the elongated rod is substantially parallel to the second and fourth sections of the continuous rod, and wherein the plurality of bends includes a second bend is configured to inhibit utensils from sliding off the elongated arm.

* * * * *